(12) United States Patent
Entani

(10) Patent No.: US 7,353,206 B2
(45) Date of Patent: Apr. 1, 2008

(54) LITERARY WORK ROYALTY ACCOUNTING METHOD, NETWORK SYSTEM THEREFOR AND RECORDING MEDIUM ON WHICH CONTROL PROGRAM THEREFOR IS RECORDED

(75) Inventor: Naruto Entani, Tokyo (JP)

(73) Assignee: NEC Corporation, Tokyo (JP)

( * ) Notice: Subject to any disclaimer, the term of this patent is extended or adjusted under 35 U.S.C. 154(b) by 607 days.

(21) Appl. No.: 09/834,944

(22) Filed: Apr. 16, 2001

(65) Prior Publication Data

US 2001/0047339 A1    Nov. 29, 2001

(30) Foreign Application Priority Data

Apr. 14, 2000 (JP) .............................. 2000-114241

(51) Int. Cl.
*G06Q 99/00* (2006.01)
(52) U.S. Cl. ............................ 705/52; 705/51; 705/67; 705/69
(58) Field of Classification Search .................... 705/52
See application file for complete search history.

(56) References Cited

U.S. PATENT DOCUMENTS 5,764,762 A * 6/1998 Kazmierczak et al. ......... 705/52
5,825,883 A * 10/1998 Archibald et al. ............. 705/53
5,910,987 A * 6/1999 Ginter et al. ................... 705/52

(Continued)

FOREIGN PATENT DOCUMENTS

JP    H7-56888 A    3/1995

(Continued)

OTHER PUBLICATIONS

Toshinari Suematsu and Hideki Imai, "A superdistribution label delivery type superdistribution system that allows for protection of user privacy," Denshi Joho Tsushin Gakkai Ronbunshi A, Japan, Institute of Electronics, Information and Communication Engineers, Oct. 25, 1998, vol. J81-A, No. 10, pp. 1377-1385.

(Continued)

*Primary Examiner*—Firmin Backer
(74) *Attorney, Agent, or Firm*—Sughrue Mion, PLLC

(57) ABSTRACT

A literary work royalty meter rate accounting method is provided by which a royalty based on the frequency of use of literary works such as music data distributed through a communication circuit is imposed on a customer. A management terminal apparatus sells a right of use of music data to a customer through a communication circuit, receives literary work use situation information such as the number of times of use, the hour of use or the amount of use of the music data by the customer, and imposes a royalty on the customer through the communication circuit in accordance with the literary work use situation information. A literary work provider terminal apparatus distributes the literary works to a customer terminal apparatus through the communication circuit. The customer terminal apparatus purchases the enciphered right of use of the music data from the management terminal apparatus, receives the music data desired by the customer and distributed thereto from the literary work provider terminal apparatus and deciphers the right of use and the music data so that the customer may use the music data. The customer terminal apparatus notifies the management terminal apparatus of the literary work use situation information through the communication circuit.

6 Claims, 4 Drawing Sheets

U.S. PATENT DOCUMENTS 6,049,789 A * 4/2000 Frison et al. .................. 705/59
6,144,946 A * 11/2000 Iwamura ....................... 705/30
6,434,535 B1 * 8/2002 Kupka et al. .................. 705/24

FOREIGN PATENT DOCUMENTS

| JP | H7-230335 A | 8/1995 |
| --- | --- | --- |
| JP | H8-54951 A | 2/1996 |
| JP | H9-282157 A | 10/1997 |
| JP | H10-20956 A | 1/1998 |
| JP | H10-20958 A | 1/1998 |
| JP | H10-51573 A | 2/1998 |
| JP | H11-53185 A | 2/1999 |
| JP | H11-85502 A | 3/1999 |
| JP | H11-96258 A | 4/1999 |
| JP | 2000-90148 A | 3/2000 |

OTHER PUBLICATIONS

Naoya Torii, Yuji Kishima, Tsuneo Katsuyama and Koji Omori, "System architecture for superdistribution," Denshi Joho Tsushin Gakkai Gijutsu Kenkyu Hokoku (ISEC94-21), Japan, Institute of Electronics, Information and Communication Engineers, Sep. 21, 1994, vol. 94, No. 240, pp. 59-66.

14. Kazunori Seki, Hiroyuki Sakakibara, Kenichi Okada and Atsushi Matsushita, "Proposal for a new software distribution arrangement using encryption," Joho Shori Gakkai Kenkyu Hokoku (93-IS-45), Japan, Information Processing Society of Japan, Jul. 20, 1993, vol. 93, No. 64, pp. 19-28.

* cited by examiner

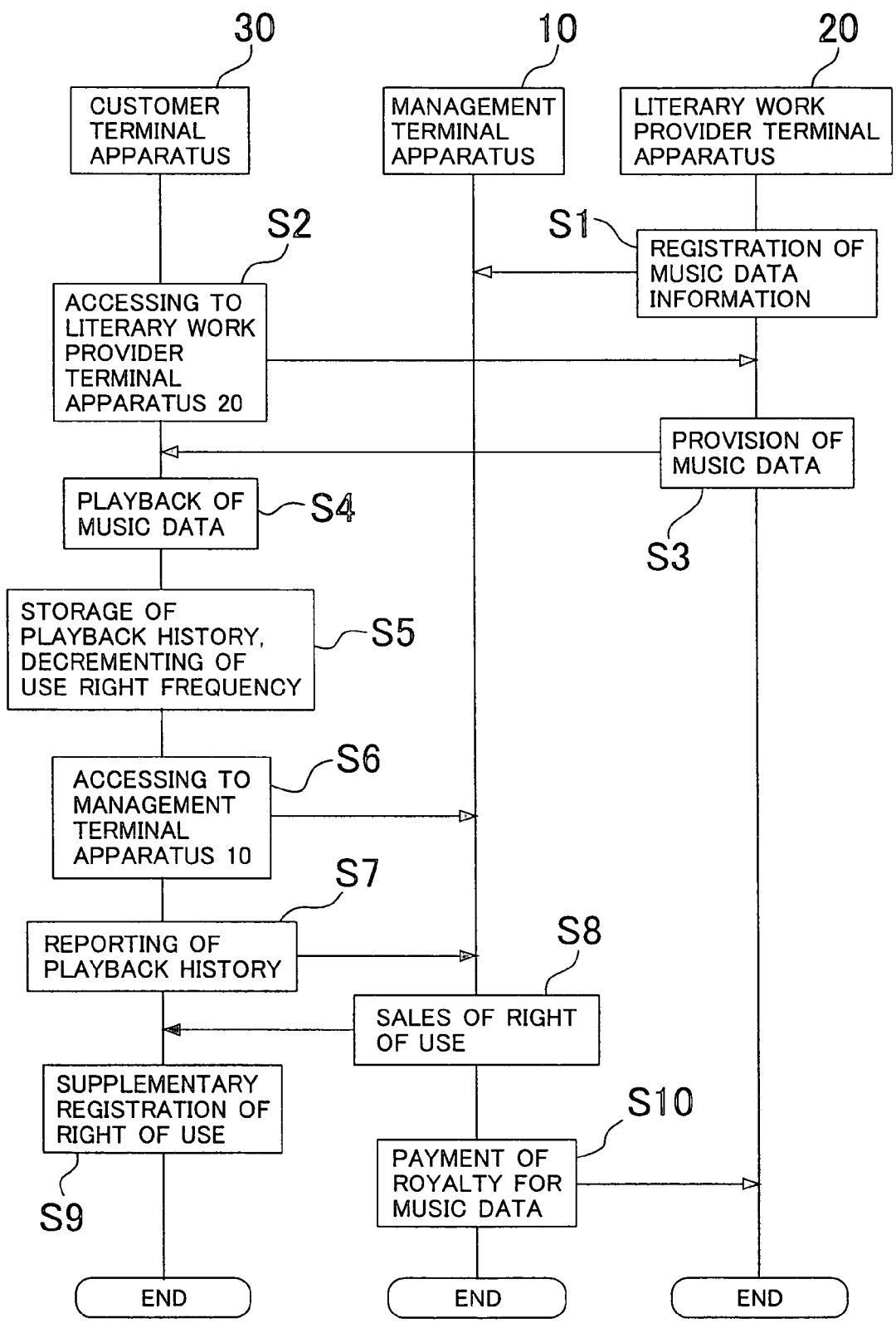

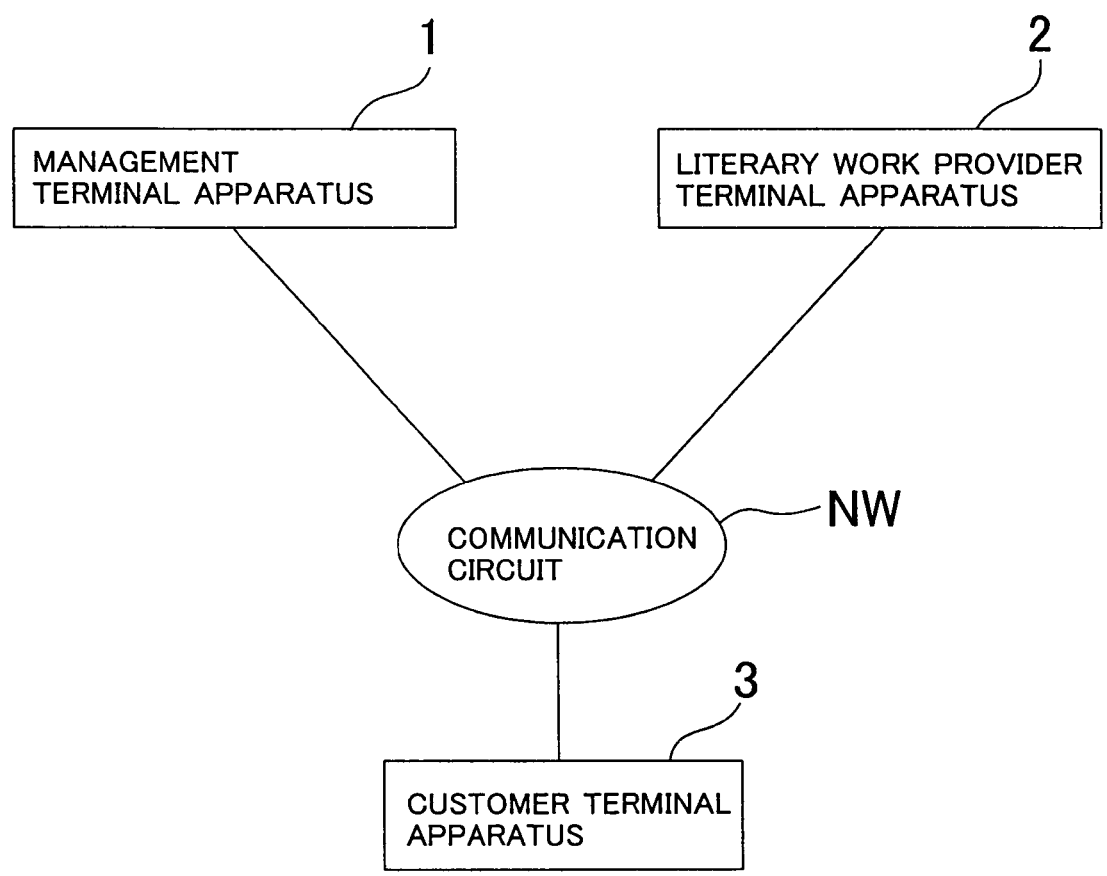

LITERARY WORK ROYALTY ACCOUNTING METHOD, NETWORK SYSTEM THEREFOR AND RECORDING MEDIUM ON WHICH CONTROL PROGRAM THEREFOR IS RECORDED

BACKGROUND OF THE INVENTION

1. Field of the Invention

The present invention relates to a literary work royalty accounting method, and more particularly to a literary work royalty accounting method suitable for use for distribution of literary works such as, for example, music data or a computer program to customers through a communication circuit such as the Internet and a network system for the literary work royalty accounting method as well as a recording medium on which a control program for the literary work royalty accounting method is recorded.

2. Description of the Related Art

Literary works such as music data or a computer program are conventionally recorded on and sold as a recording medium such as a compact disk to a customer. Recently, however, distribution of such literary works on-line to customers through a communication circuit such as the Internet is increasing progressively. Therefore, the production cost, transportation cost and selling cost which have been required conventionally are not required any more, and the rate of the royalty for copyright occupying in the royalty for literary works imposed on customers is increasing.

A network system for carrying out a literary work royalty accounting method of the type described conventionally has, for example, such a configuration as shown in FIG. 4. Referring to FIG. 4, the network system includes a management terminal apparatus 1, a literary work provider terminal apparatus 2, and a customer terminal apparatus 3 which are connected to each other by a communication circuit NW such as, for example, the Internet. The management terminal apparatus 1 is formed from an information processing apparatus such as, for example, a work station or a server and is managed on consignment of a literary work provider. The management terminal apparatus 1 enciphers the right of use of literary works such as, for example, music data and sells it to a customer through the communication circuit NW. The literary work provider terminal apparatus 2 is formed from an information processing apparatus such as, for example, a work station or a server and distributes music data to the customer terminal apparatus 3 through the communication circuit NW. In this instance, the literary work provider terminal apparatus 2 enciphers and distributes the music data. The customer terminal apparatus 3 purchases the enciphered right of use of literary works through the communication circuit NW in advance, and receives music data desired by a customer and distributed from the literary work provider terminal apparatus 2 through the communication circuit NW and deciphers the enciphered right of use and music data so that the music data may be used by the customer.

In the network system shown in FIG. 4, the right of use of music data is enciphered and transmitted from the management terminal apparatus 1 through the communication circuit NW and then received by the customer terminal apparatus 3. The right of use includes a predetermined royalty to be imposed. Enciphered music data is laid open on the communication circuit NW from the literary work provider terminal apparatus 2. The customer will operate the customer terminal apparatus 3 to receive and use music data literary works distributed through the communication circuit NW.

The conventional literary work royalty accounting method, however, has the following problem.

In particular, since a fixed amount of money is set as the royalty for each of music data distributed from the literary work provider terminal apparatus 2 to the customer terminal apparatus 3 through the communication circuit NW, even if the customer uses the music data freely after the music data are received, the fixed royalty is imposed on the customer irrespective of the frequency of use of the music data. Therefore, to a customer who uses music data comparatively less frequently, an excessively high royalty is imposed relative to the frequency of use. On the other hand, where music data are used by a customer who uses such music data frequently, the royalty for copyright received by the proprietor of the copyright of the music data is excessively low relative to the frequency of use by the customer. In this manner, the conventional literary work royalty accounting method has a problem in that the royalty is not imposed reasonably based on the frequency of use of literary works.

SUMMARY OF THE INVENTION

It is an object of the present invention to provide a literary work royalty meter rate accounting method by which a royalty based on the frequency of use of literary works distributed through a communication circuit is imposed on a customer.

In order to attain the object described above, according to an aspect of the present invention, there is provided a literary work accounting method, comprising a use right sales step by a seller of selling a right of use of literary works to a customer, and an accounting step of imposing a royalty for the literary works on the customer in accordance with the number of times of use, the hour of use or the amount of use of the literary works by the customer.

According to another aspect of the present invention, there is provided a literary work accounting method, comprising a use right sales step by a seller of selling a right of use of literary works to a customer, a literary work distribution step by a literary work provider of distributing the literary works to the customer through a communication circuit, and an accounting step by the seller of imposing a royalty for the literary works on the customer through the communication circuit in accordance with the number of times of use, the hour of use or the amount of use of the literary works by the customer.

According to a further aspect of the present invention, there is provided a literary work accounting method, comprising a use right sales step by a seller of selling a right of use of literary works to a customer through a communication circuit, a literary work distribution step by a literary work provider of distributing the literary works to the customer through the communication circuit, and an accounting step by the seller of imposing a royalty for the literary works on the customer through the communication circuit in accordance with the number of times of use, the hour of use or the amount of use of the literary works by the customer.

In the literary work royalty accounting method according to the second or third aspect of the present invention, preferably the literary works is distributed in an enciphered state.

In the literary work royalty accounting method according to the first, second or third aspect of the present invention, preferably the right of use of the literary works is sold in an enciphered state.

According to a still further aspect of the present invention, there is provided a network system, comprising a management terminal apparatus for selling a right of use of literary works to a customer through a communication circuit and imposing a royalty for the literary works on the customer through the communication circuit in accordance with the number of times of use, the hour of use or the amount of use of the literary works by the customer, a literary work provider terminal apparatus for distributing the literary works to the customer through the communication circuit, and a customer terminal apparatus for purchasing the right of use of the literary works from the management terminal apparatus through the communication circuit, receiving the literary works desired by the customer and distributed thereto from the literary work provider terminal apparatus through the communication circuit and notifying the management terminal apparatus of the number of times of use, the hour of use or the amount of use of the literary works.

Preferably, the management terminal apparatus sells the right of use of the literary works in an enciphered state.

Preferably, the management terminal apparatus distributes the literary works in an enciphered state.

The customer terminal apparatus may include decipherment means for deciphering the literary works and the right of use of the literary works both received in an enciphered form from the literary work provider terminal apparatus.

According to a yet further aspect of the present invention, there is provided a recording medium on which a control program for causing a computer to execute the literary work royalty accounting method according to the first, second or third aspect of the present invention described above is recorded.

With the literary work royalty accounting method, the network system and the control program according to the present invention, a seller sells a right of use of literary works to a customer in advance and thereafter imposes a royalty for the literary works on the customer in accordance with the number of times of use, the hour of use or the amount of use of the literary works by the customer. Therefore, an amount of money corresponding to a situation of use of the literary works can be imposed on the customer. Therefore, to a customer whose use frequency is low, imposition of an excessively great amount of money relative to its use frequency can be prevented. Also where the literary works are used by a customer whose use frequency is high, the royalty for a copyright to be received by the proprietor of the copyright of the literary works is prevented from being excessively low relative to the use frequency of the customer. Further, to a literary work provider, since collection of the royalty for the literary works can be automated fully when compared with a conventionally system, significant augmentation in efficiency of business can be anticipated. Besides, since the literary works are distributed in an enciphered state, illegal use of the literary works by a customer without payment of the royalty can be prevented. Furthermore, since the right of use of the literary works is sold in an enciphered state, forgery of the right of use or alteration of the literary work information can be prevented.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 3 is a sequence diagram illustrating the literary work royalty accounting method to which the present invention is applied; and FIG. 4 is a block diagram of a network system on which a conventional literary work royalty accounting method is carried out.

DESCRIPTION OF THE PREFERRED EMBODIMENT

Figure 1:
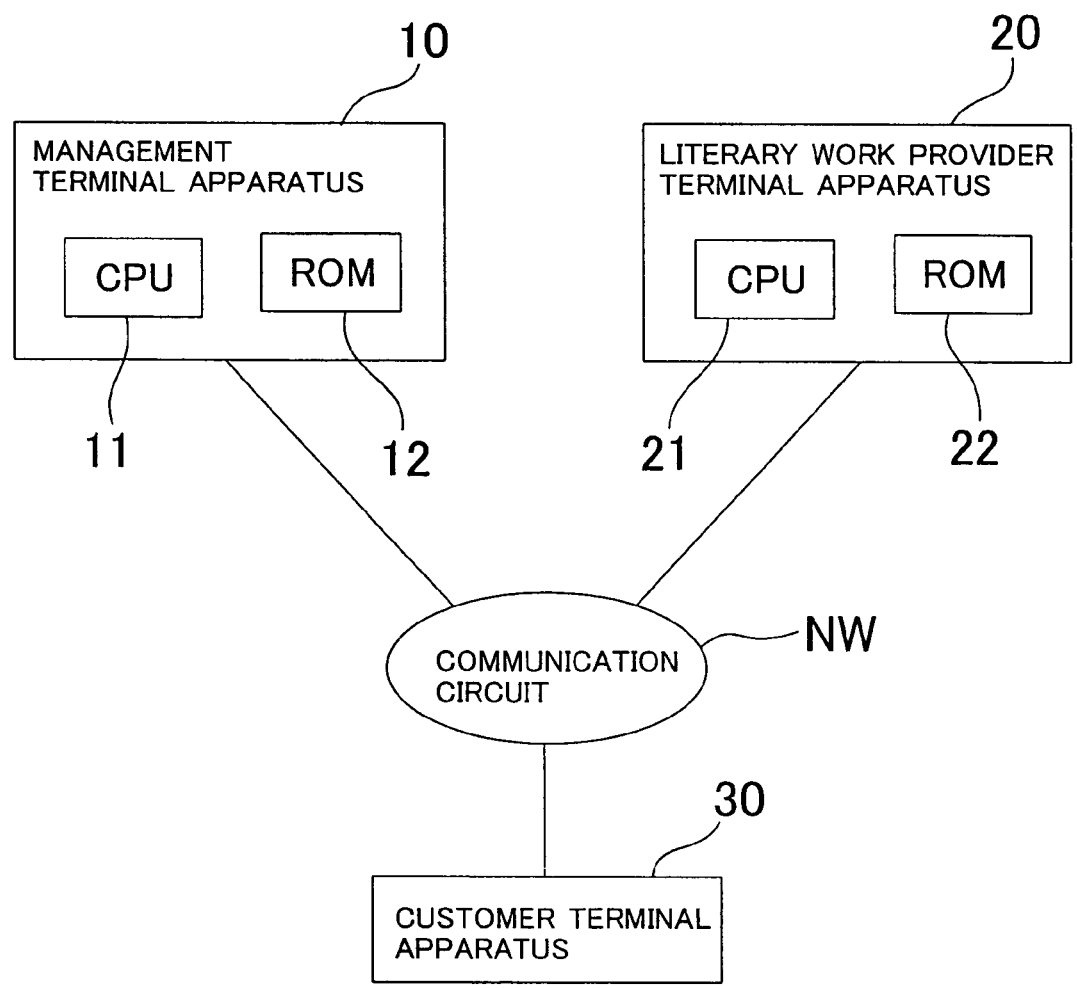
FIG. 1 is a block diagram of a network system on which a literary work royalty accounting method to which the present invention is applied is carried out.

Referring to FIG. 1, there is shown a network system on which a literary work royalty accounting method to which the present invention is applied is carried out. The network system shown includes a management terminal apparatus 10, one or more literary work provider terminal apparatus 20 (only one is shown in FIG. 1), and one or more 30 (only one is shown in FIG. 1), which are connected to each other by a communication circuit NW such as, for example, the Internet. The management terminal apparatus 10 is formed from an information processing apparatus such as, for example, a work station or a server, and is administrated on consignment of a literary work provider. The management terminal apparatus 10 includes a central processing unit (hereinafter referred to simply as "CPU") 11 for controlling the entire management terminal apparatus 10 and a recording medium 12 such as, for example, a read-only memory (hereinafter referred to as "ROM") on which a control program for operating the CPU 11 is recorded. The management terminal apparatus 10 sells the right of use of literary works to customers through the communication circuit NW in advance, receives literary work use situation information such as the number of times of use, the hour of use or the amount of use of the literary works by the customers, and imposes the royalties for the literary works on the customers in accordance with the literary work use situation information through the communication circuit NW. Further, the management terminal apparatus 10 enciphers and sells the right of use of the literary works.

Each of the literary work provider terminal apparatus 20 is formed from an information processing apparatus such as, for example, a work station or a server. The literary work provider terminal apparatus 20 includes a CPU 21 for controlling the entire literary work provider terminal apparatus 20 and has a recording medium 22 such as, for example, ROM on which a control program for operating the CPU 21 is recorded. The literary work provider terminal apparatus 20 distributes literary works such as, for example, music data to the customer terminal apparatus 30 through the communication circuit NW. In this instance, the literary work provider terminal apparatus 20 enciphers and distributes the music data. Each of the customer terminal apparatus 30 purchases an enciphered right of use of the literary works from the management terminal apparatus 10 through the communication circuit NW in advance, receives enciphered music data desired by the customer and distributed from the literary work provider terminal apparatus 20 through the communication circuit NW, and deciphers the enciphered right of use and music data so that the music data are used by the customer. Further, the customer terminal apparatus 30 notifies the management terminal apparatus 10 of literary work use situation information such as the number of times of use, the hour of use or the amount of use of the music data through the communication circuit NW and performs a procedure for payment of the royalty for the music data by the customer using a predetermined settlement function.

Figure 2:
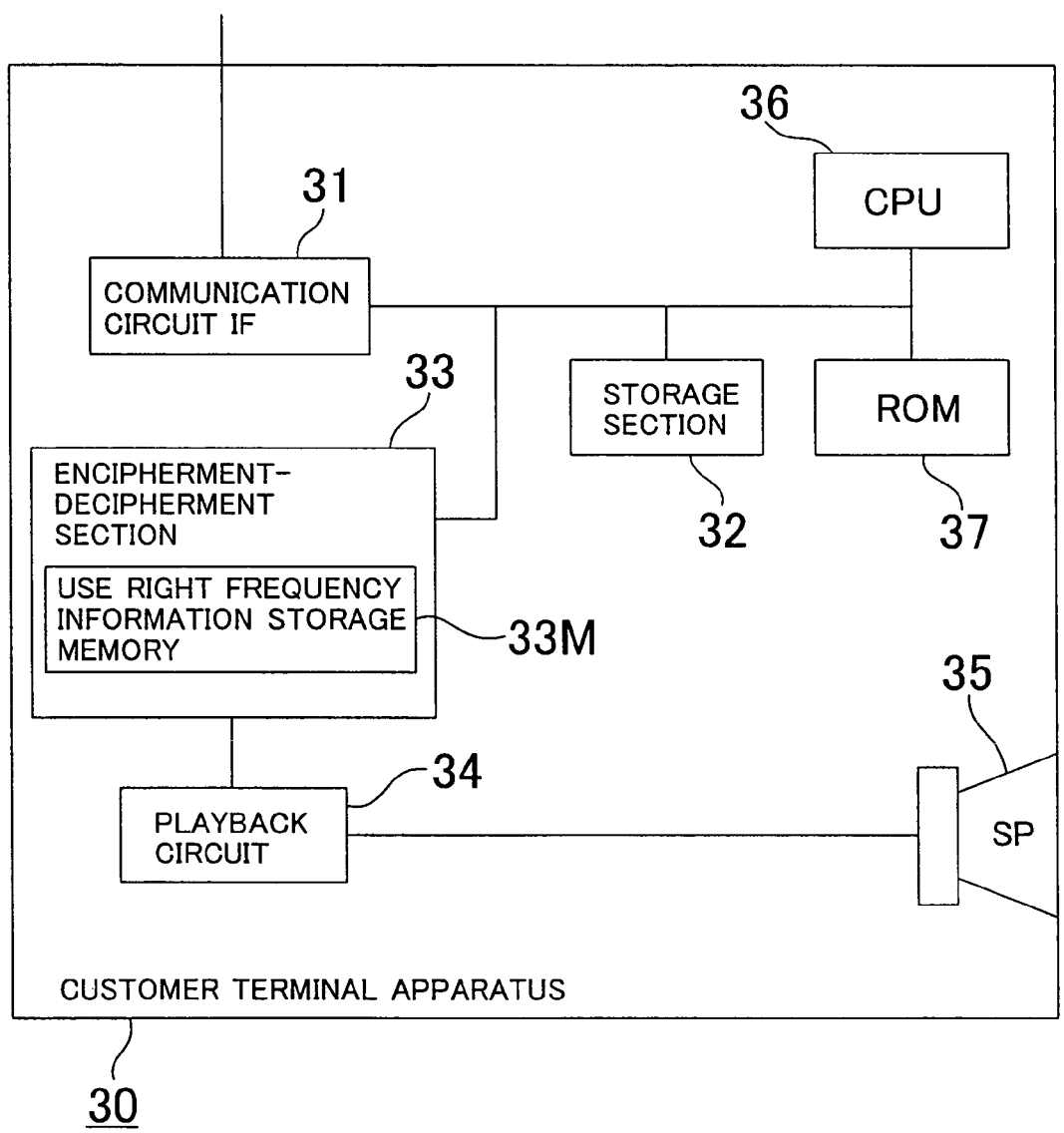
FIG. 2 is a schematic block diagram showing an electric configuration of a customer terminal apparatus shown in FIG. 1.

FIG. 2 shows an electric configuration of the customer terminal apparatus 30 shown in FIG. 1.

Referring to FIG. 2, the customer terminal apparatus 30 includes a communication circuit interface 31, a storage section 32, an encipherment-decipherment section 33 serving as decipherment means, a playback circuit 34, a speaker 35, a CPU 36, and a recording medium 37 such as, for example, a ROM. The communication circuit interface 31 repeats input/output signals between the communication circuit NW and the customer terminal apparatus 30. The storage section 32 is formed from, for example, a random access memory (RAM), a hard disk apparatus or a like apparatus and stores enciphered music data. The encipherment-decipherment section 33 deciphers enciphered music data and an enciphered right of use of the music data. The encipherment-decipherment section 33 has a use right frequency information storage memory 33M for storing use right frequency information. The use right frequency information is numerical value information to which an upper limit value is set. The use right frequency information is inhibited from being referred to from the outside of the encipherment-decipherment section 33. The playback circuit 34 is formed from, for example, a digital/analog converter, a power amplifier and so forth. The playback circuit 34 converts digital music data deciphered by the encipherment-decipherment section 33 into analog music data, amplifies the analog music data and signals the amplified analog music data to the speaker 35 so that the music data is outputted from the speaker 35. The CPU 36 controls the entire customer terminal apparatus 30. The ROM 37 stores a recording program for operating the CPU 36.

FIG. 3 illustrates the literary work royalty accounting method to which the present invention is applied.

Referring to FIG. 3, the customer will access the management terminal apparatus 10 from the customer terminal apparatus 30 through the communication circuit NW, and a seller will sell the right of use of music data to the customer from the management terminal apparatus 10 through the communication circuit NW (use right sales step). A literary work provider such as, for example, a music data provider registers information regarding the music data registered in the literary work provider terminal apparatus 20, that is, a music number allocated uniquely to each music data to be distributed from the literary work provider terminal apparatus 20 and information for identification of the literary work provider terminal apparatus 20 of the music data provider itself in advance into the management terminal apparatus 10. The music number and the terminal apparatus identification number are set to unique values in the network system through arbitration between the literary work provider terminal apparatus 20 and the management terminal apparatus 10. Each of the music data possessed by the literary work provider terminal apparatus 20 is laid open to the public in an enciphered state with the music number applied thereto through the communication circuit NW (step S1). In this instance, the music data in the form of digital data is enciphered, for example, with a pseudo random number added thereto.

The customer will access the literary work provider terminal apparatus 20 from the customer terminal apparatus 30 through the communication circuit NW to order desired music data (step S2). Thereafter, the music data desired by the customer is distributed from the literary work provider terminal apparatus 20 to the customer terminal apparatus 30 through the communication circuit NW (literary work distribution step) and stored into the storage section 32 in the customer terminal apparatus 30 (step S3). Since the music data provided to the customer has been enciphered on the literary work provider terminal apparatus 20 side, the customer cannot utilize the music data using a popular playback machine or popular software. Therefore, in order for the customer terminal apparatus 30 to perform playback processing of the music data, the encipherment-decipherment section 33 therein first refers to the use right frequency information (that is, the usable number of times, the usable hour or the usable amount of the literary works) stored in the use right frequency information storage memory 33M. When the user right frequency is higher than "0", the encipherment-decipherment section 33 reads out the enciphered music data from the storage section 32 to start decipherment and signals the deciphered music data to the playback circuit 34. Then, the music data is played back by the speaker 35 and the speaker 35. The decipherment is performed by decoding the music data enciphered with the pseudo random signal by means of a decoder. If the use right frequency is "0", then the decipherment processing is not performed and the music data is not played back (step S4).

At a point of time when playback processing of the music data is performed by more than a fixed number of times, the encipherment-decipherment section 33 decrements the use right frequency by one unit number to impose the royalty for the music data (accounting step) and stores the music number information of the music data being currently played back. The music number information is stored as a playback history with regard to the use right frequency of all of the used music data (step S5). If the remaining number of the use right frequency becomes reduced to 0 or a small number, in order to have the use right frequency to be supplemented, the customer will access the management terminal apparatus 10 from the customer terminal apparatus 30 through the communication circuit NW (step S6). After the customer terminal apparatus 30 is connected to the management terminal apparatus 10, the music number information stored upon playback of music the data till then is enciphered by the encipherment-decipherment section 33 and transmitted to the management terminal apparatus 10. The transmitted music number information is deciphered and stored by the management terminal apparatus 10, and is counted together with music number information acquired from the other customer terminal apparatus for the individual music numbers. A result of the counting is reported as a playback history (step S7).

Thereafter, the customer will utilize the settlement system from the customer terminal apparatus 30 through the communication circuit NW to pay the literary work royalty for a predetermined amount of money and purchase the use right frequency corresponding to the amount of money from the management terminal apparatus 10 (step S8). The use right frequency is deciphered by the encipherment-decipherment section 33 and supplemented to the use right information remaining in the use right frequency information storage memory 33M so that total use right information is registered into the use right frequency information storage memory 33M anew (step S9). Meanwhile, from the management terminal apparatus 10, the music data royalty based on the music number information counted for each fixed period of time are paid to the literary work provider terminal apparatus 20. Music data providers to whom such royalties should be paid are specified readily based on mapping between the music number information registered in advance and the identification numbers of the literary work provider terminal apparatus 20. The payment processing is performed by the settlement system through the communication circuit NW or by conventional settlement means (step S10).

The settlement system through the communication circuit NW performs settlement, for example, in such a manner as described below.

A customer will operate a personal computer or the like to access a shop for sales of literary works laid open by the WWW (World Wide Web) on the communication circuit NW. If a literary work the customer wants to purchase is available in the accessed shop, then the customer will notify the shop of a credit card number. The shop will access the credit company to confirm the validity of the received credit card number on-line using a verification system. After it is confirmed that the credit card is valid, the shop performs settlement with the credit company for a price for the literary work designated by the customer, thereby concluding a purchasing contract. Later, the customer will pay to the credit company by a suitable method.

As described above, in the present embodiment, a seller sells a right of use of music data to a customer in advance and thereafter imposes a royalty for music data on the customer in accordance with the number of times of use, the hour of use or the amount of use of the music data by the customer. Therefore, an amount of money corresponding to a situation of use of music data can be imposed on the customer. Therefore, to a customer whose use frequency is low, imposition of an excessively great amount of money relative to its use frequency can be prevented. Also where music data are used by a customer whose use frequency is high, the royalty for a copyright to be received by the proprietor of the copyright of the music data is prevented from being excessively low relative to the use frequency of the customer. Further, to a music data provider, since collection of the royalty for music data can be automated fully when compared with a conventionally system, significant augmentation in efficiency of business can be anticipated. Besides, since music data is distributed in an enciphered state, illegal use of the music data by a customer without payment of the royalty can be prevented. Furthermore, since the right of use of music data is sold in an enciphered state, forgery of the right of use or alteration of music data information can be prevented.

While a preferred embodiment of the present invention has been described using specific terms, a detailed configuration is not limited to the embodiment, and changes and variations may be made to the embodiment without departing from the spirit or scope of the present invention. For example, while, in the embodiment, the encipherment-decipherment section 33 decrements the use right frequency by one unit number at a point of time when playback processing of music data is performed by more than a fixed number of times, the use right frequency may be decremented not based on the number of times of playback processing but based on the amount of music data or the hour of use of music data. Further, while, in the embodiment, music data is applied as a literary work, any other literary work may be applied such as, for example, a computer program, or image data of an image such as, for example, a movie, a photograph or a picture only if it can be distributed through the communication circuit NW such as the Internet. In this instance, for encipherment of image data, various scramble methods such as, for example, a method of reversing the polarity for each line of image data or another method of reversing the polarity for each frame are used, and the encipherment-decipherment section 33 need include a decoder ready for the scramble method. Further, the present invention can be applied also where, for example, map data for car navigation is successively distributed as a car travels.

What is claimed is:

1. A literary work distribution network system, comprising:
   one or more customer terminal apparatuses;
   a management terminal apparatus for
      enciphering and selling a right of use of a literary work to a customer through a communication circuit,
      enciphering and transmitting use right frequency information for limitation of at least one of a number of times of use, an hour of use and an amount of use of the literary work to one of said customer terminal apparatuses, and
      imposing a royalty for the literary work through the communication circuit in accordance with the number of times indicated by the use right frequency information; and
   a literary work provider terminal apparatus for enciphering and distributing the literary work to a customer through the communication circuit;
   wherein each of said one or more customer terminal apparatuses comprise:
      a storage section for storing enciphered literary work data distributed thereto from said literary work provider terminal apparatus,
      deciphering means for deciphering the enciphered literary work data and right of use of the literary work data stored in said storage section, and
      a playback circuit for playing back the deciphered literary work data;
   wherein said deciphering means comprises a use right frequency information storage memory provided therein for storing the use right frequency information deciphered by said deciphering means in such a manner that the deciphered use right frequency information cannot be referred to from the outside; and
   wherein said deciphering means refers to the use right frequency information stored in said use right frequency information storage memory to read out the enciphered literary work data from said storage section and signals the read out literary work data to said playback circuit.

2. A literary work distribution network system as claimed in claim 1, wherein said deciphering means updates the use right frequency information stored in said use right frequency information storage memory in response to the number of times of playback by said playback circuit.

3. A literary work distribution network system as claimed in claim 2, wherein each of said one or more customer terminal apparatuses operates in response to the use right frequency stored in said use right frequency information storage memory such that, when the use right frequency is higher than "0", the enciphered literary work data stored in said storage section can be read out and deciphered by means of said deciphering means and then the deciphered literary work data can be signaled to and played back by said playback circuit, but when the use right frequency is "0", the decipherment by said deciphering means is not performed and the enciphered literary work data cannot be played back.

4. A literary work distribution network system as claimed in claim 1, wherein the literary work is music data.

5. A recording medium on which a control program for causing a computer to implement the following functions is recorded:
- enciphering and selling a right of use of a literary work to a customer through a communication circuit;
- enciphering and transmitting use right frequency information for limitation of at least on of a number of times of use, an hour of use, and an amount of use of the literary work to a customer terminal apparatus;
- imposing a royalty for the literary work through the communication circuit in accordance with the number of times indicated by the use right frequency information;
- enciphering and distributing the literary work to the customer through the communication circuit;
- wherein the customer terminal apparatus deciphers and plays back the enciphered literary work based on the use right frequency information.

6. A literary work distribution network system, comprising:
- at least one literary work provider terminal apparatus, comprising control means enciphering and transmitting the literary works information;
- at least one management terminal apparatus, operated independently from the at least one literary work provider, comprising control means for selling use right frequency to a user and for enciphering and transmitting the use right frequency information;
- at least one customer terminal apparatus; comprising:
  - interface means for receiving literary works information from the at least one literary work provider terminal apparatus and use right frequency information from the at least one management terminal apparatus, via a communication circuit;
  - storage means for
  - an encipherment-decipherment section, comprising:
    - storage means for storing use right frequency information received from the at least one management terminal apparatus and the literary works information received from the at least one literary work provider terminal apparatus,
    - deciphering means for deciphering the use right frequency information and the literary works information in the storage means, and
  - presentation means for presenting the deciphered literary works information to a user;
- wherein the use right frequency information includes a use right frequency number, associated with the literary works information, indicating at least one of a permitted number of times of use, a permitted time of use, and a permitted amount of use;
- wherein the deciphering means can not decipher the literary works information if the use right frequency number is "0"; and
- wherein the deciphering means decreases the use right frequency number based on the presentation of the deciphered literary works.

* * * * *